(12) United States Patent
Okabe (10) Patent No.: US 9,616,714 B2
(45) Date of Patent: Apr. 11, 2017

(54) HEAVY DUTY PNEUMATIC TIRE

(71) Applicant: Sumitomo Rubber Industries, Ltd., Kobe-shi, Hyogo (JP)

(72) Inventor: Taro Okabe, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 319 days.

(21) Appl. No.: 14/243,088

(22) Filed: Apr. 2, 2014

(65) Prior Publication Data

US 2014/0299244 A1    Oct. 9, 2014

(30) Foreign Application Priority Data

Apr. 3, 2013   (JP) .................. 2013-077913

(51) Int. Cl.
  *B60C 11/13*   (2006.01)
  *B60C 11/03*   (2006.01)
  *B60C 11/12*   (2006.01)

(52) U.S. Cl.
  CPC ........ *B60C 11/0309* (2013.04); *B60C 11/033* (2013.04); *B60C 11/0306* (2013.04); *B60C 11/125* (2013.04); *B60C 2011/0365* (2013.04); *B60C 2200/06* (2013.04)

(58) Field of Classification Search
  CPC ............. B60C 11/0309; B60C 11/0306; B60C 11/125; B60C 11/033; B60C 2011/0365
  See application file for complete search history.

(56) References Cited

U.S. PATENT DOCUMENTS

| 4,320,790 A * | 3/1982 | Corner | B60C 11/11 |
| | | | 152/209.27 |
| 2005/0000613 A1* | 1/2005 | Maruoka | B60C 11/00 |
| | | | 152/209.1 |
| 2006/0254684 A1 | 11/2006 | Tamura | |
| 2013/0160909 A1* | 6/2013 | Atake | B60C 11/0311 |
| | | | 152/209.25 |
| 2014/0216620 A1* | 8/2014 | Tanaka | B60C 11/125 |
| | | | 152/209.25 |

(Continued)

FOREIGN PATENT DOCUMENTS

| EP | 541004 A1 * | 5/1993 |
| EP | 841199 A2 * | 5/1998 |
| JP | 2006-315579 A | 11/2006 |

OTHER PUBLICATIONS

Machine translation for Europe 541,004 (no date).*

*Primary Examiner* — Steven D Maki
(74) *Attorney, Agent, or Firm* — Birch, Stewart, Kolasch & Birch, LLP (57) ABSTRACT

A heavy duty pneumatic tire includes a tread portion provided with at least three circumferential main grooves, and a plurality of lateral grooves extending between adjacent main grooves or between one main groove and a tread edge, to form at least one block row comprising a plurality of blocks. The block row comprises a plurality of pitch elements each of which consists of circumferentially adjacent one lateral groove and one block. The tread portion has a land ratio in a range of from 70% to 80%. The block row comprises a number of pitch elements in a range of from 40 to 50, and each lateral groove has a groove width in a range of from 5% to 15% in relation to a circumferential length of the block in each pitch element.

10 Claims, 6 Drawing Sheets

(56) References Cited

U.S. PATENT DOCUMENTS

2014/0224397 A1\* 8/2014 Okabe .................. B60C 11/033
                                                152/209.23
2014/0224398 A1\* 8/2014 Okabe ................ B60C 11/1263
                                                152/209.23

\* cited by examiner

HEAVY DUTY PNEUMATIC TIRE

BACKGROUND OF THE INVENTION

Field of the Invention

The present invention relates to a heavy duty pneumatic tire that may exhibit better performance with respect to wet grip, traveling noise and fuel consumption.

Description of the Related Art

Japanese Unexamined Patent application Publication No. 2006-315579 discloses a heavy duty pneumatic tire including a tread portion with a plurality of tread blocks that are divided by circumferentially extending main grooves and a plurality of lateral grooves. To economize fuel consumption of the tire above, it may be effective to increase a land ratio of the tread portion so that the tread portion has high rigidity.

On the other hand, to improve wet performance of tires, it may be effective to increase a number of pitch elements on the tread portion so that the tread portion has a large number of lateral groove edge elements. Here, the pitch element refers to a repeated design unit for a tread pattern of the tread portion, and each includes circumferentially adjacent one block and one lateral groove. Furthermore, to improve wet performance of tires, it may be effective to increase a groove width of each lateral groove.

However, a tread portion having a high land ratio usually tends to have excessively low groove volume that may exhibit poor wet grip performance. Furthermore, a tread portion having a large number of pitch elements usually tends to have low rigidity thereof that may cause high fuel consumption. Furthermore, lateral grooves with wide widths on a tread portion of a tire tend to generate large air pumping noise during traveling

SUMMARY OF THE INVENTION

The present invention has been worked out in light of the circumstances described above, and has a main object of providing a heavy duty pneumatic tire that may exhibit better performance with respect to wet grip, traveling noise and fuel consumption.

According to one aspect of the present invention, a heavy duty pneumatic tire includes a tread portion provided with at least three circumferentially and continuously extending main grooves, and a plurality of lateral grooves extending between adjacent main grooves or between one main groove and a tread edge, to form a block row comprising a plurality of blocks. The block row includes a plurality of pitch elements each of which consists of circumferentially adjacent one lateral groove and one block. The tread portion has a land ratio in a range of from 70% to 80%. The block row includes a number of pitch elements in a range of from 40 to 50, and each lateral groove has a groove width in a range of from 5% to 15% in relation to a circumferential length of the block in each pitch element.

In another aspect of the present invention, the main grooves include a pair of crown main grooves disposed on both sides of a tire equator, the lateral grooves include a plurality of crown lateral grooves extending between the crown main grooves to form a crown block row comprising a plurality of crown blocks, each crown lateral groove comprises a shallow bottom part having a groove depth in a range of from 50% to 60% in relation to a maximum groove depth of the crown main grooves, and the shallow bottom part is provided with a crown groove-bottom sipe that extends along a longitudinal direction of the crown lateral groove and has a depth in a range of from 25% to 40% in relation to the maximum groove depth of the crown main grooves.

In another aspect of the present invention, the main grooves further include a pair of shoulder main grooves each of which is disposed at a nearest side of the tread edge, and a pair of middle main grooves each of which is disposed between the crown main groove and the shoulder main groove, the lateral grooves further include a plurality of axially outer middle lateral grooves extending between the middle main groove and the shoulder main groove to form an outer middle block row including a plurality of axially outer middle blocks, the middle main grooves and the outer middle lateral grooves include respective shallow bottom parts each having a groove depth in a range of from 15% to 70% in relation to the maximum groove depth of the crown main grooves, the shallow bottom part of the middle main groove is provided with a middle groove-bottom sipe that extends along a longitudinal direction of the middle main groove, the shallow bottom part of the outer middle lateral groove is provided with a outer middle groove-bottom sipe that extends along a longitudinal direction of the outer middle lateral groove, and each depth of the middle groove-bottom sipe and the outer middle groove-bottom sipe is in a range of from 20% to 75% in relation to the maximum groove depth of the crown main grooves.

In another aspect of the present invention, the tread portion further includes a circumferentially and continuously extending inner middle rib arranged between the crown main groove and the middle main groove, the inner middle rib is provided with a plurality of axially inner middle lateral grooves extending axially inward from the middle main groove without reaching the crown main groove, each axially inner middle lateral groove includes a shallow bottom part having a groove depth in a range of from 15% to 70% in relation to the maximum groove depth of the crown main grooves, the shallow bottom part of the inner middle lateral groove is provided with an inner middle groove-bottom sipe that extends along a longitudinal direction of the inner middle lateral groove, and each depth of the inner middle groove-bottom sipe is in a range of from 20% to 75% in relation to the maximum groove depth of the crown main grooves.

DETAILED DESCRIPTION

An embodiment of the present invention will be explained below with reference to the accompanying drawings.

Figure 1:
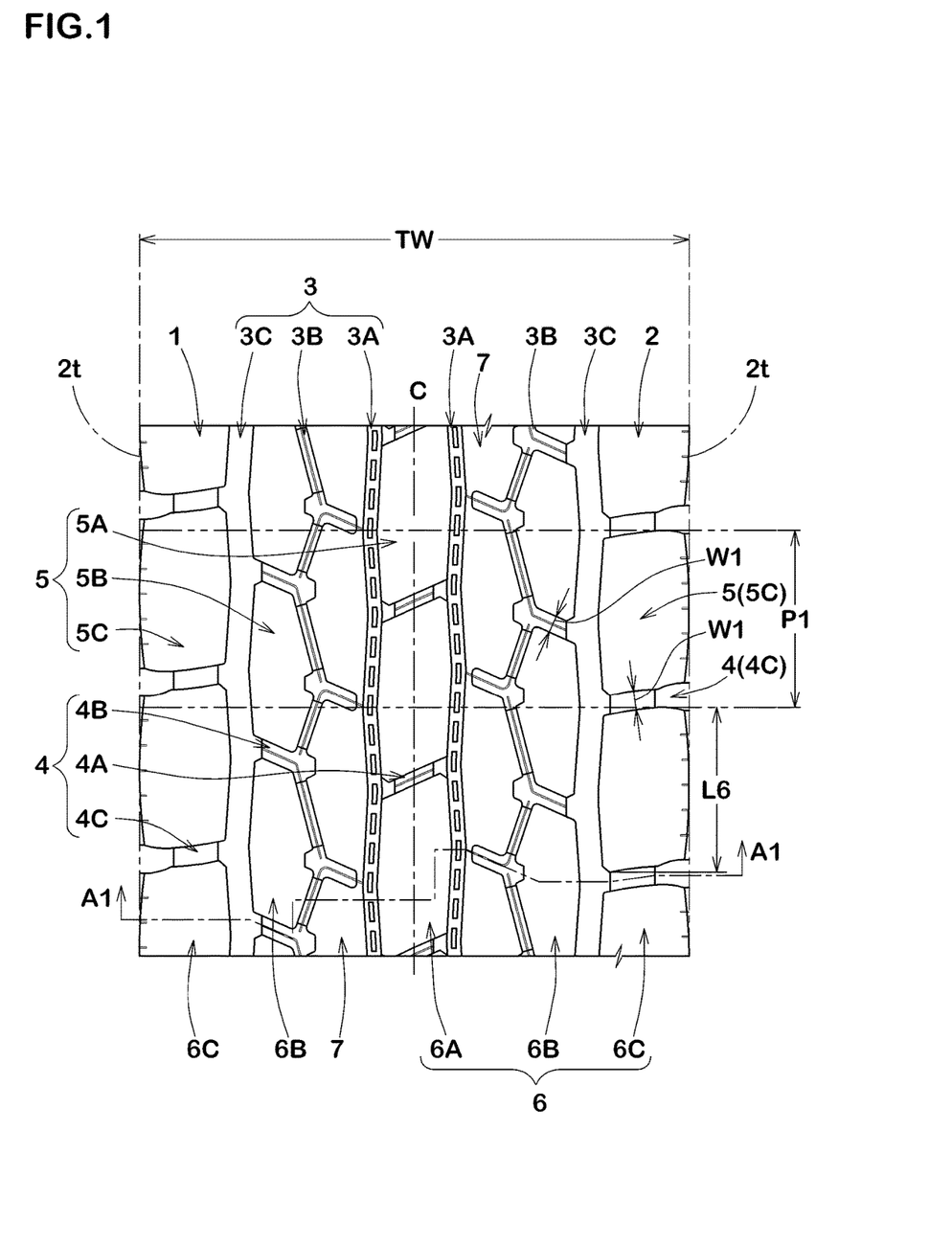
FIG. 1 is a development view illustrating a tread portion of a heavy duty pneumatic tire in accordance with an embodiment of the present invention.
Figure 2:
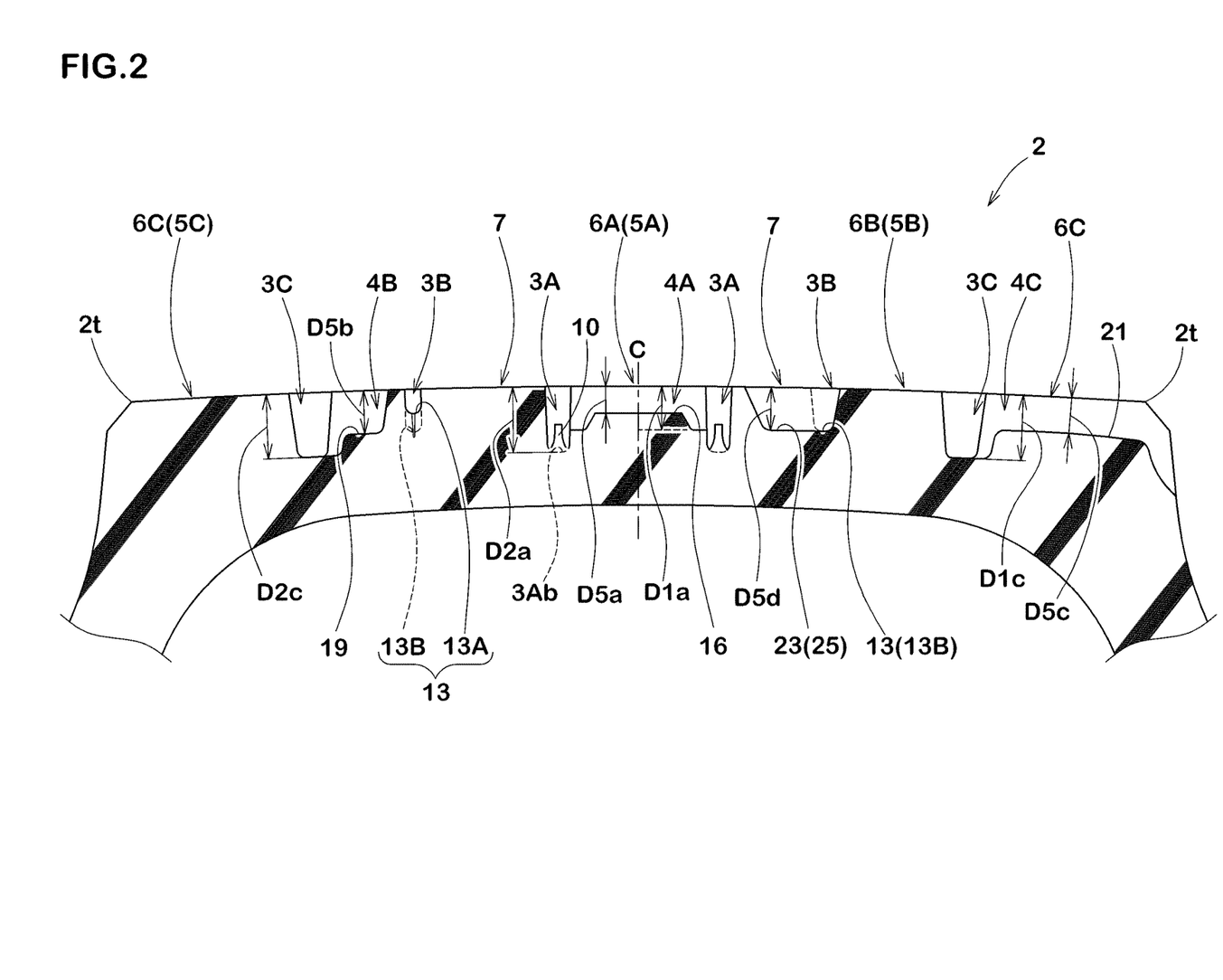
FIG. 2 is a cross sectional view taken along a line A1-A1 in FIG. 1.

Referring to FIG. 1 and FIG. 2, a heavy duty pneumatic tire 1 in accordance with the present embodiment is suitably used for trucks or buses.

The tire includes a tread portion 2 being provided with at least three, preferably six circumferentially and continuously extending main grooves 3. In this embodiment, the main grooves 3 include a pair of crown main grooves 3A and 3A disposed on both sides of a tire equator C, a pair of shoulder main grooves 3C and 3C each disposed axially outside the crown main groove 3A so as to position the nearest side of a tread edges 2t, and a pair of middle main grooves 3B and 3B each disposed between the crown main groove 3A and the shoulder main groove 3C.

Furthermore, the tread portion 2 is provided with a plurality of lateral grooves 4 that extend between adjacent main grooves 3 and 3, or between one main groove 3 and the tread edge 2t. In this embodiment, the lateral grooves 4 include a plurality of crown lateral grooves 4A extending between the crown main grooves 3A and 3A, a plurality of axially outer middle lateral grooves 4B extending between the middle main groove 3B and the shoulder main groove 3C, and a plurality of shoulder lateral grooves 4C extending between the shoulder main groove 3C and the tread edge 2t.

When the tread portion 2 distinctly has an axially outermost ground contact edge on its appearance, the tread edge 2t is defined as its ground contact edge. When it is difficult to identify an axially outermost ground contact edge of the tread portion 2 on its appearance, the tread edge 2t is defined as an axially outer end in a ground contact patch of the tread portion 2 under a standard loaded condition in which the tire 1 is mounted on a standard wheel rim with a standard pressure and is loaded with a standard tire load at a camber angle of set to zero.

Here, the standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

In this application including specification and claims, various dimensions, positions and the like of the tire refer to those under a standard unloaded condition of the tire unless otherwise noted. The standard unloaded condition is such that the tire 1 is mounted on the standard wheel rim with the standard pressure and is loaded with no tire load. The axial distance between the tread edges 2t and 2t of the tire is defined as its tread width TW.

The tread portion 2 includes at least one block row 6 that includes a plurality of blocks 5 separated by the main groove 3 and the lateral grooves 4, and a pair of inner middle ribs 7 each of which circumferentially and continuously extends between the crown main groove 3A and the middle main groove 2B.

The at least one block row 6 includes a crown block row 6A that includes a plurality of crown blocks 5A separated by the crown main grooves 3A and the crown lateral grooves 4A, a pair of outer middle block rows 6B each of which includes a plurality of outer middle blocks 5B separated by the middle main grooves 3B, the shoulder main groove 3C, and the outer middle lateral grooves 4B, and a pair of shoulder block rows 6C each of which includes a plurality of shoulder blocks 5C separated by the shoulder main groove 3C and the shoulder lateral grooves 4C.

The tread portion 2 in accordance with the present embodiment has a land ratio in a range of from 70% to 80%, more preferably in a range of from 75% to 78%. The land ratio of from 70% to 80% may provide the tread portion 2 with a sufficient groove area, as well as high pattern rigidity for preventing its large deformation during traveling. Thus, the tire 1 in accordance with the present embodiment may exhibit better wet grip performance and economize fuel consumption. Here, the land ratio of the tread portion 2 means a ratio "Sc/Sa" of a net ground contact area "Sc" to a gross total ground contact area "Sa" measured by plugging up the whole grooves of the tread portion 2.

When the land ratio of the tread portion 2 is less than 70%, it might be difficult to economize fuel consumption of the tire due to the low pattern rigidity of the tread portion 2. On the other hand, when the land ratio of the tread portion 2 is more than 80%, it might be difficult to improve wet grip performance of the tire due to its low groove area.

The tread portion 2 includes circumferentially arranged pitch elements P1 each of which consists of circumferentially adjacent one block 5 and one lateral groove 4 each other. In this embodiment, the tread portion 2 includes a number of pitch elements P in a range of from 40 to 50. Furthermore, each lateral groove 4 has a groove width W1 in a range of from 5% to 15% in relation to a circumferential length L6 of the block 5 in each pitch element P1. Since the block 5 has high circumferential rigidity while having a sufficient lateral groove edges and volume, the tire 1 in accordance with the present embodiment may offer better wet grip performance, as well as low rolling resistance for economizing fuel consumption.

Furthermore, since the groove width W1 of the lateral groove 4 is adjusted within a certain range above, the tire 1 in accordance with the present embodiment may reduce the air pumping noise generated therein during traveling. In this embodiment, the crown block row 6A, the outer middle block rows 6B, and the shoulder block rows 6C satisfy the ratio of the groove width W1 to the block length L6 described above.

When the number of the pitch elements P is less than 40, wet grip performance of the tire tends to deteriorate due to few lateral groove edges. When the number of the pitch elements P is more than 50, it might be difficult to economize fuel consumption of the tire due to low circumferential rigidity of each block 5. More preferably, the tread portion 2 includes a number of pitch elements P in a range of from 42 to 48.

When the groove width W1 of the lateral groove is less than 5% in relation to the length L6 of the block 5, wet grip performance of the tire tends to deteriorate due to less groove volume. When the groove width W1 of the lateral groove is more than 15% in relation to the length L6 of the block 5, it might be difficult to economize fuel consumption of the tire due to low circumferential rigidity of each block 5, and difficult to reduce the air pumping noise generated from the lateral grooves 4. Preferably, each lateral groove 4 has its groove width W1 in a range of from 8% to 12% in relation to the length L6 of the block 5 in each pitch element P1.

As described above, the tire 1 in accordance with the present invention may exhibit better performance with respect to wet grip, traveling noise and fuel consumption.

Figure 3:
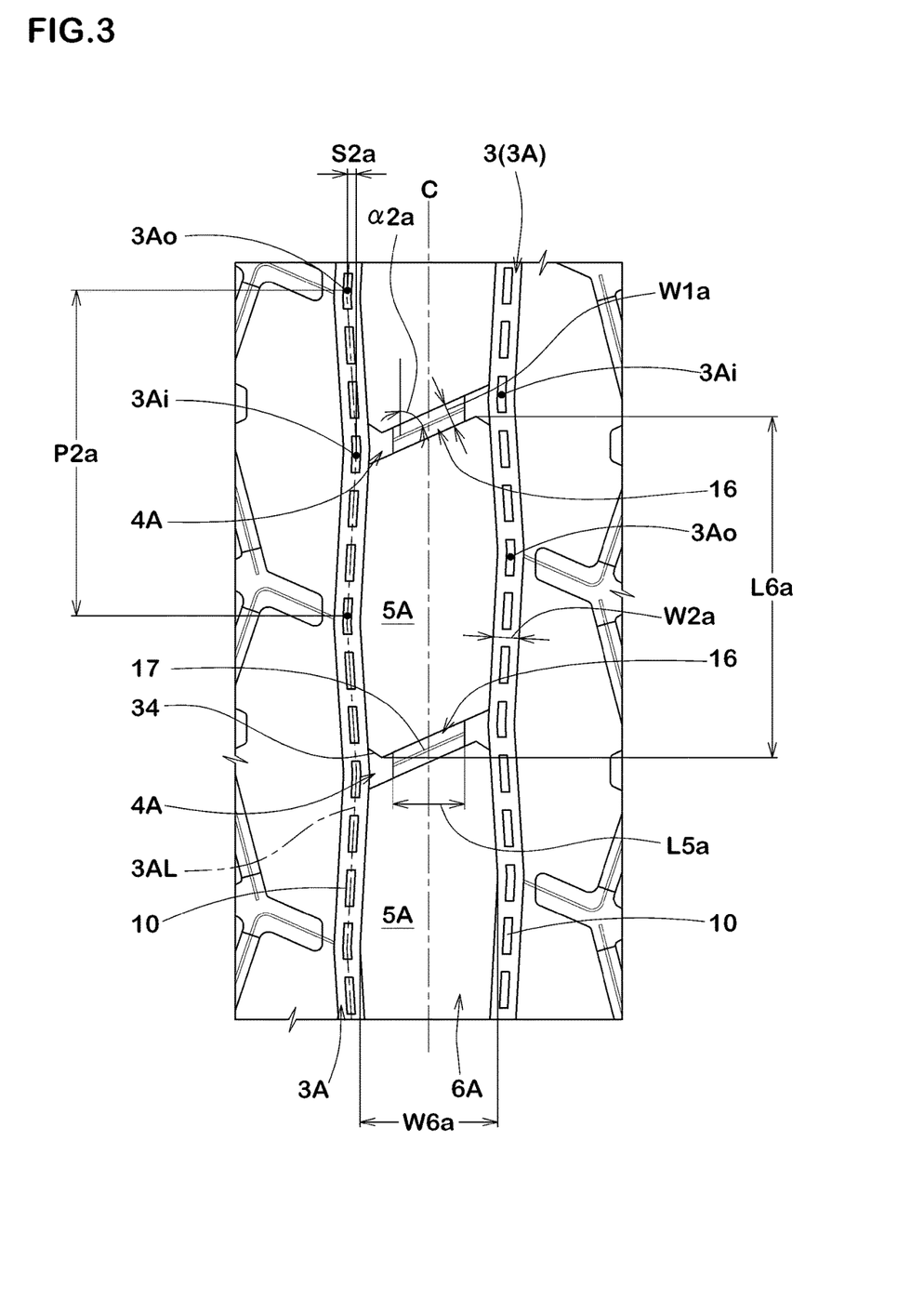
FIG. 3 is a partial enlarged view illustrating a crown block row of FIG. 1.

As shown in FIG. 3, each of the crown main grooves 3A and 3A is configured as a zigzag form with small zigzag amplitude S2a, and includes an axially innermost protruding portion 3Ai and an axially outermost protruding portion 3Ao. Regarding the zigzag phase of the crown main grooves 3A, one is shifted with respect to the other at a circumferential distance.

The crown main grooves 3A may improve not only wet grip performance but also traction force of the tire by removing the water from under the tread portion 2 using its lateral edge components. Furthermore, such a crown main groove 3A extending in a zigzag manner may prevent columnar resonance noise generated therefrom. Furthermore, the arrangement of crown main grooves 3A having a phase difference may efficiently disperse pitch noise generated therefrom.

To further improve the advantage above, each crown main groove 3A preferably has its groove width W2a in a range of from 2% to 4% in relation to the tread width TW (shown in FIG. 1), and its maximum groove depth D2a (shown in FIG. 2) in a range of from 5% to 8% in relation to the tread width TW. Furthermore, the zigzag pitch length P2a of the crown main groove 3A is preferably set in a range of from 25% to 35% in relation to the tread width TW. Furthermore, the zigzag amplitude S2a between the axially innermost protruding portion 3Ai and the axially outermost protruding portion 3Ao on the groove centerline 3AL of the crown main groove 3A is preferably in a range of from 1% to 3% in relation to the tread width TW.

Referring to FIG. 2 and FIG. 3, each crown main groove 3A is provided with a plurality of protrusions 10 for avoiding stone-biting thereto, which protrude radially outward from its groove bottom and are arranged along the groove centerline 3AL of the crown main groove 3A. Each protrusion 10 is configured as a circumferentially long rectangular shape in a plan view, for example. Such protrusions 10 may prevent stone-biting into the crown main grooves 3A while maintaining wet grip performance of the tire.

Figure 4:
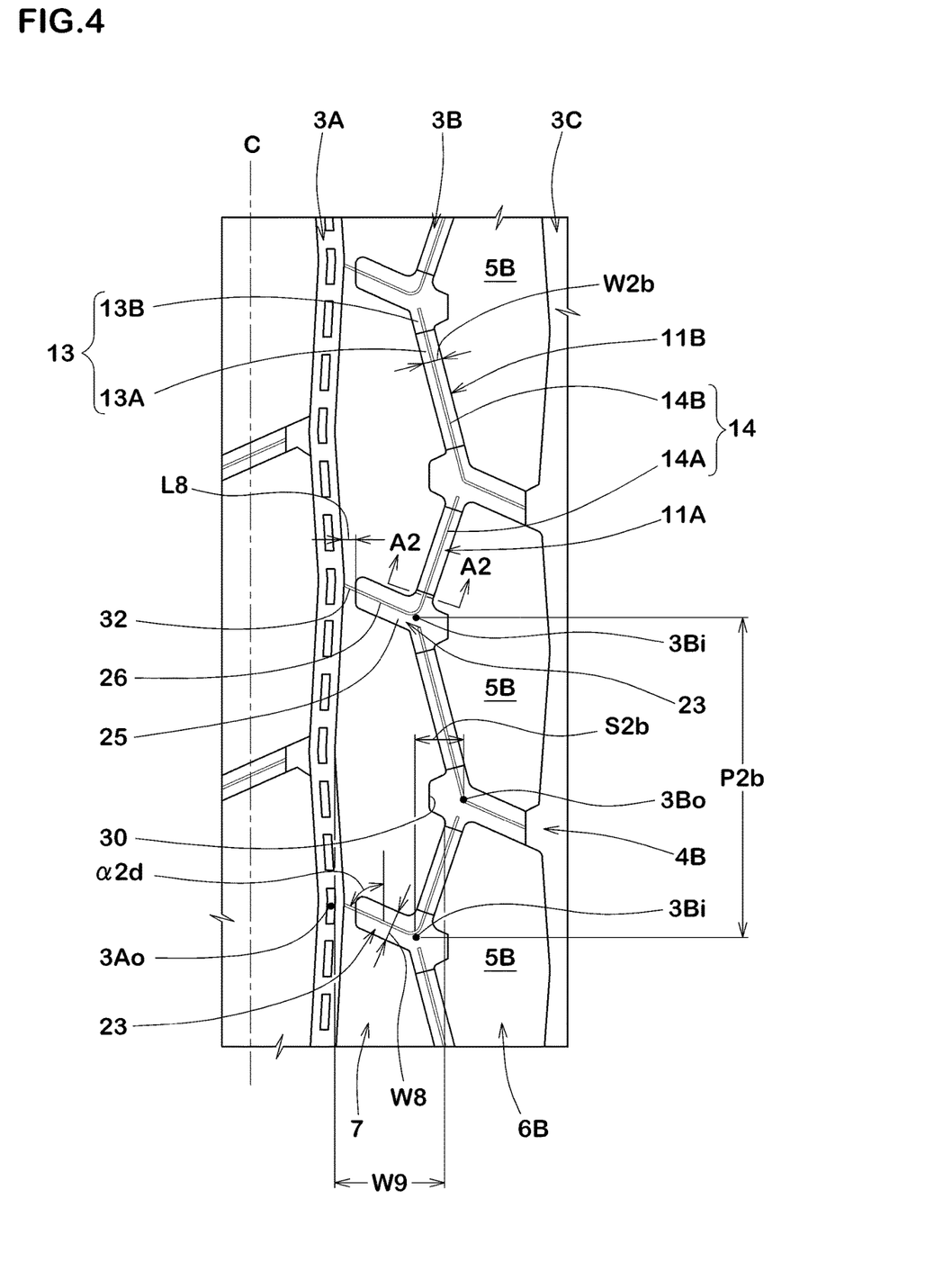
FIG. 4 is a partial enlarged view illustrating an inner middle rib and outer middle block row of FIG. 1.

As shown in FIG. 4, the middle main groove 3B is configured as a zigzag form with relatively larger zigzag amplitude S2b than the amplitude S2a (shown in FIG. 3) of the crown main grooves 3A, and includes an axially innermost protruding portion 3Bi and an axially outermost protruding portion 3Bo. Furthermore, the middle main groove 3B alternately includes a short inclined element 11A, and a long inclined element 11B having its circumferential length larger than that of the short inclined element 11A. Since the middle main groove 3B tends to have lateral edge components with well balance, wet grip performance as well as traction performance of the tire may further be improved.

To efficiently improve the advantage above, the middle main groove 3B preferably has its groove width W2b in a range of from 1% to 3% in relation to the tread width TW (shown in FIG. 1). Furthermore, the zigzag pitch length P2b of the middle main groove 3B is preferably set in a range of from 25% to 35% in relation to the tread width TW. Furthermore, the zigzag amplitude S2b of the middle main groove 3B is preferably in a range of from 3% to 5% in relation to the tread width TW.

Figure 5:
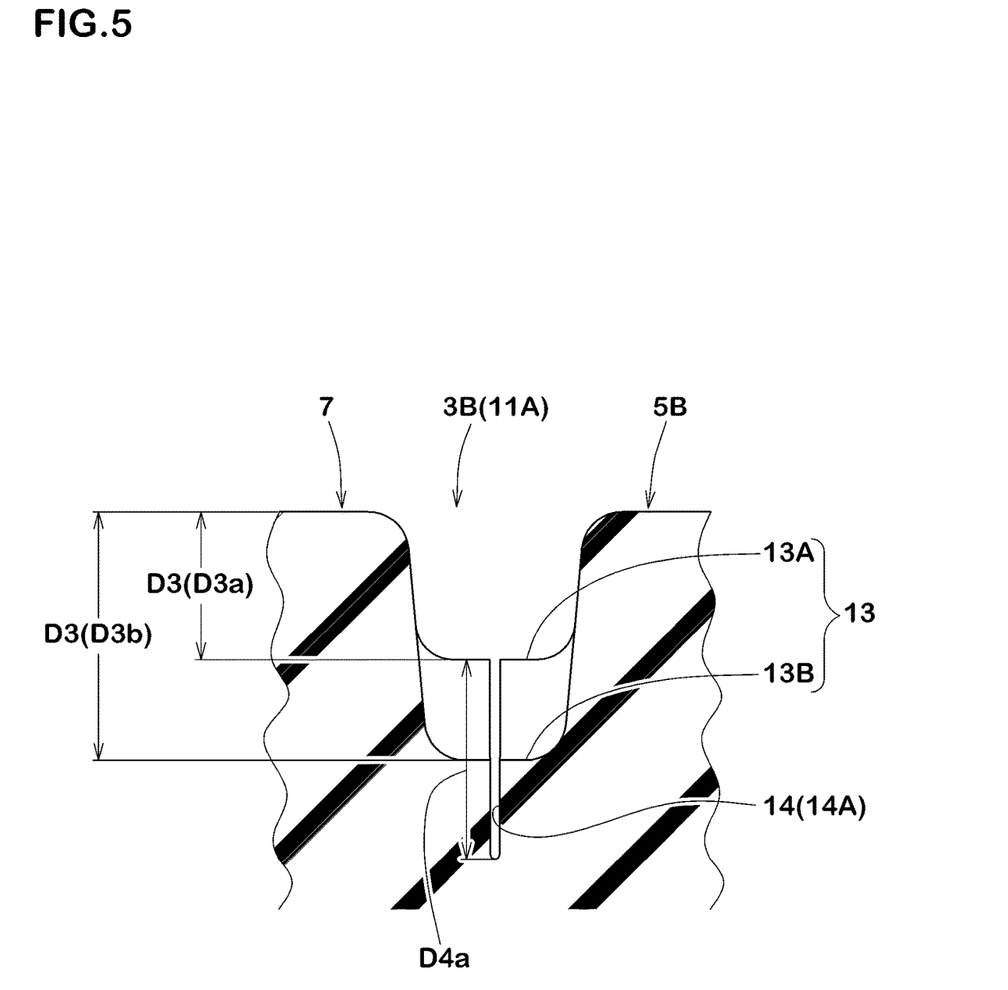
FIG. 5 is a cross sectional view taken along a line A2-A2 in FIG. 4.

As shown in FIG. 4 and FIG. 5, the middle main groove 3B is provided with a shallow bottom part 13 having a groove depth D3 in a range of from 15% to 70% in relation to the maximum groove depth D2a (shown in FIG. 2) of the crown main grooves 3A. In this embodiment, the shallow bottom part 13 comprises a plurality of first shallow bottom parts 13A having groove depths D3a, and a plurality of second shallow bottom parts 13B having groove depths D3b greater than the groove depths D3a of the first shallow bottom parts 13a. The first shallow bottom parts 13A are disposed on the respective short and inclined elements 11A and 11B. The second shallow bottom parts 13B are disposed on each zigzag corner of the middle main groove 3B so that the first and second shallow bottom parts 13A and 13B are alternately arranged in the circumferential direction of the tire.

The first and second shallow bottom parts 13A and 13B connect the outer middle blocks 5B with the inner middle rib 7 with so that deformation thereof may reduce. Thus, the first and second shallow bottom parts 13A and 13B may help to lower energy loss generated on the outer middle blocks 5B and the inner middle rib 7 during traveling, thereby lowering rolling resistance of the tire.

Furthermore, since the first shallow bottom part 13A has the groove depth D3a smaller than the groove depth D3b of the second shallow bottom part 13B, the outer middle blocks 5B may efficiently be enhanced in lateral rigidity. On the other hand, since the second shallow bottom part 13B has the groove depth D3b larger than the groove depth D3a of the first shallow bottom part 13A, sufficient groove volume of the middle main groove 3B for improving wet grip performance is maintained.

When the respective groove depths D3a and D3b of first and second shallow bottom parts 13A and 13B are set more than 70% in relation to the maximum groove depth D2a (shown in FIG. 2), it might be difficult to economize fuel consumption of the tire due to respective low rigidity of the outer middle blocks 5B and the inner middle rib 7. When the respective groove depths D3a and D3b of first and second shallow bottom parts 13A and 13B are set less than 15% in relation to the maximum groove depth D2a (shown in FIG. 2), it might be difficult to maintain wet grip performance of the tire due to less groove volume of the middle main groove 3B. In view of above, the respective groove depths D3a and D3b of first and second shallow bottom parts 13A and 13B are preferably set in a range of from 25% to 60% in relation to the maximum groove depth D2a.

To further improve the advantage above, the groove depth D3a of the first shallow bottom part 13A is preferably set in a range of from 47% to 58%, more preferably in a range of from 50% to 55% in relation to the groove depth D3b of the second shallow bottom part 13B.

A plurality of middle groove-bottom sipes 14 that extend along the groove centerline of the middle main groove 3B are disposed on each of the first short shallow bottom parts 13A and the second shallow bottom parts 13B. The middle groove-bottom sipe 14 may deform during traveling of the tire so as to expand the groove width W2a of the middle main groove 3B, thereby further improving wet performance of the tire. Furthermore, since the middle groove-bottom sipe 14 may come into contact with the ground at the last stage of wear of the tread portion 2, its sipe edge may help to improve wet performance.

To further improve the advantage above, the middle groove-bottom sipe 14 preferably has the depth D4a in a range of from 20% to 75%, more preferably in a range of from 25% to 70% in relation to the maximum groove depth D2a (shown in FIG. 2) of the crown main groove 3A. When the depth D4a of the middle groove-bottom sipe 14 is less than 20% in relation to the maximum groove depth D2a of the crown main groove 3A, it might be difficult to expand the groove width W2a of the middle main groove 3B during traveling. When the depth D4a of the middle groove-bottom sipe 14 is more than 75% in relation to the maximum groove depth D1 of the crown main groove 3A, it might be difficult to economize fuel consumption of the tire because relatively large deformation may occur on the inner middle rib 7 and outer middle blocks 5B during traveling.

The middle groove-bottom sipes 14 include a short sipe 14A disposed on the short inclined element 11A of the middle main groove 3B, and a long sipe 14B disposed on the long inclined element 11B of the middle main groove 3B. These short sipe 14A and long sipe 14B are separated from one another at each axially outermost and innermost protruding portion 3Bo and 3Bi of the middle main groove 3B to improve wet grip performance and low rolling resistance of the tire by preventing excessive deformation around the middle main groove 3B.

Figure 6:
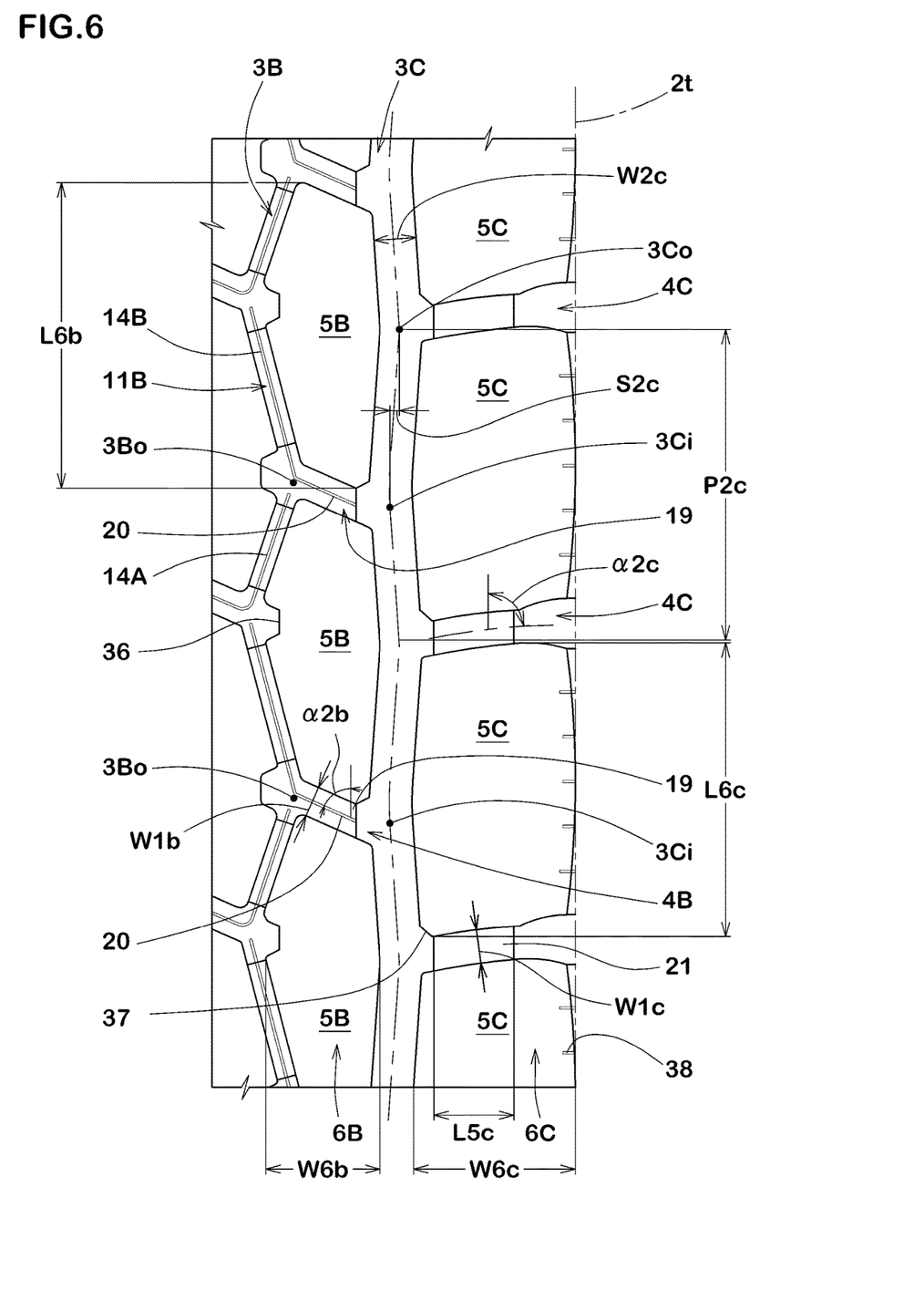
FIG. 6 is a partial enlarged view illustrating a shoulder block row of FIG. 1.

As shown in FIG. 1 and FIG. 6, the shoulder main groove 3C is configured as a zigzag form with small zigzag amplitude S2c, and includes an axially innermost protruding portion 3Ci and an axially outermost protruding portion 3Co. The shoulder main grooves 3C may improve not only wet performance, but also traction force of the tire using its lateral edge components.

In order to further improve the advantage above, the shoulder main groove 3C preferably has its groove width W2c in a range of from 4% to 6% in relation to the tread width TW (shown in FIG. 1), and its maximum groove depth D2c (shown in FIG. 2) in a range of from 5% to 8% in relation to the tread width TW. Furthermore, the zigzag pitch length P2c of the shoulder main groove 3C is preferably set in a range of from 25% to 35% in relation to the tread width TW. Furthermore, the zigzag amplitude S2c between the axially innermost protruding portion 3Ci and the axially outermost protruding portion 3Co on the groove centerline of the shoulder main groove 3C is preferably set in a range of from 1% to 3% in relation to the tread width TW. A plurality of protrusions for avoiding stone-biting thereto may be provided in the shoulder main groove 3C, same as the crown main groove 3A.

As shown in FIG. 3, each crown lateral groove 4A extends so as to couple between the respective axially innermost protruding portions 3Ai and 3Ai of the crown main grooves 3A and 3A while inclining at angle of α2a of from 55 to 75 degrees with respect to the circumferential direction of the tire. Such a crown lateral groove 4A may effectively scratch the road using its inclined groove edges during traveling to improve traction force. Furthermore, such a crown lateral groove 4A inclined at the angle α2a with respect to the circumferential direction of the tire reduces pitch noise during traveling while improving drainage performance of the tire. In order to further improve the advantages above, the crown lateral groove 4A preferably has its maximum groove depth D1a (shown in FIG. 2) set in a range of from 5% to 8% in relation to the tread width TW (shown in FIG. 1).

As shown in FIG. 2 and FIG. 3, the crown lateral groove 4A includes a shallow bottom part 16 having a depth D5a in a range of from 50% to 60%, more preferably in a range of from 53% to 57% in relation to the maximum groove depth D2a of the crown main groove 3A. The shallow bottom part 16 connects between the circumferentially adjacent crown blocks 5A and 5A for enhancing circumferential rigidity thereof. Thus, since energy loss generated from each crown block 5A during traveling reduces, fuel consumption of the tire may be economized.

In the same point of view, the shallow bottom part 16 preferably has its axial length L5a in a range of not less than 50%, more preferably not less than 60%, but preferably not more than 80%, more preferably not more than 70% in relation to an axial width W6a of the crown block 5A.

The shallow bottom part 16 is provided with a crown groove-bottom sipe 17 that extends along the groove centerline of the crown lateral groove 4A, for example. The crown groove-bottom sipe 17 may deform during traveling of the tire so as to expand the groove width W1a of the crown lateral groove 4A, thereby further improving wet performance of the tire. Furthermore, since the crown groove-bottom sipe 17 may come into contact with the ground at the last stage of wear of the tread portion 2, the edges of the crown groove-bottom sipe 17 may help to improve the wet performance. Furthermore, the crown groove-bottom sipe 17 may provide the crown block 5A with flexibility for reducing energy loss during traveling.

In order to further improve the advantages above, the crown groove-bottom sipe 17 preferably has its depth D7a (not shown) smaller than the depth D4a (shown in FIG. 5) of the middle groove-bottom sipe 14. Preferably, the depth D7a of the crown groove-bottom sipe 17 may be set in a range of not less than 25%, more preferably not less than 30%, but preferably not more than 40%, more preferably not more than 35% in relation to the maximum groove depth D2a of the crown main groove 3A.

As shown in FIG. 1 and FIG. 6, the outer middle lateral groove 4B extends so as to couple between the axially outmost protruding portion 3Bo of the middle main groove 3B and the axially innermost protruding portion 3Ci of the shoulder main groove 3C while inclining at an angle α2b in a range of from 45 to 75 degrees with respect to the circumferential direction of the tire. Such an outer middle lateral groove 4B may improve wet grip performance and steering stability of the tire, same as the crown lateral groove 4A (shown in FIG. 3).

The outer middle lateral groove 4B includes a shallow bottom part 19 having a depth D5b (shown in FIG. 2) in a range of from 15% to 70%, more preferably in a range of from 25% to 60% in relation to the maximum groove depth D2a of the crown main groove 3A. The shallow bottom part 19 connects between the circumferentially adjacent outer middle blocks 5B and 5B for enhancing circumferential rigidity thereof. Thus, since energy loss generated from each outer middle block 5B during traveling reduces, fuel consumption of the tire may be economized.

The shallow bottom part 19 is provided with an outer middle groove-bottom sipe 20 that extends along the groove centerline of the outer middle lateral groove 4B, for example. The outer middle groove-bottom sipe 20 may deform during traveling of the tire so as to expand the groove width W1b of the outer middle lateral groove 4B, thereby further improving wet performance of the tire. Furthermore, since the outer middle groove-bottom sipe 20 may come into contact with the ground at the last stage of wear of the tread portion 2, the edges of the outer middle groove-bottom sipe 20 may help to improve the wet performance.

In order to further improve the advantages above, the outer middle groove-bottom sipe 20 preferably has its depth D7b (not shown) in a range of not less than 20%, more preferably not less than 25%, but preferably not more than 75%, more preferably not more than 70% in relation to the maximum groove depth D2a of the crown main groove 3A.

To further improve wet grip performance of the tire, the axially inner end of the outer middle groove-bottom sipe 20 is preferably connected to the long sipe 14B of the middle main groove 3B at the axially outermost protruding portion 3Bo. On the other hand, to further improve steering stability while maintaining low fuel consumption by increasing rigidity of the outer middle block row 6B, the outer middle groove-bottom sipe 20 is preferably separated from the short sipe 14A of the middle main groove 3B.

The shoulder lateral groove 4C extends so as to couple between the axially outmost protruding portion 3Co of the shoulder main groove 3C and the tread edge 2t while inclining at an angle α2c in a range of from 70 to 90 degrees with respect to the circumferential direction of the tire. Such a shoulder lateral groove 4C may improve wet grip performance and steering stability of the tire, same as the crown lateral groove 4A and the outer middle lateral groove 4C. Preferably, the shoulder main groove 4C has the maximum groove depth D1c (shown in FIG. 2) in a range of from 5% to 8% in relation to the tread width TW.

As shown in FIG. 2 and FIG. 6, the shoulder lateral groove 4C includes a shallow bottom part 21 having a depth D5c in a range of from 15% to 70%, more preferably in a range of from 25% to 60% in relation to the maximum groove depth D2a of the crown main groove 3A. The shallow bottom part 21 connects between the circumferentially adjacent shoulder blocks 5C and 5C for enhancing circumferential rigidity thereof. Thus, since energy loss generated from each shoulder block 5C during traveling reduces, fuel consumption of the tire may be economized. Preferably, the shallow bottom part 21 has its axial length L5c in a range of from 40% to 60% in relation to the axial width W6c of the shoulder block 5C.

In this embodiment, the shallow bottom part 21 of the shoulder lateral groove 4C is not provided with any groove-bottom sipe to enhance rigidity of the shoulder blocks 5C, thereby improving steering stability and low fuel consumption.

The inner middle rib 7 continuously extends in the circumferential direction of the tire between the crown main groove 3A and the middle main groove 3B. The "rib" refers to a land portion formed on the tread portion 2 which circumferentially and continuously extends, and is not perfectly separated into two portions by a lateral groove. Here, the "sipe" shall mean a slit which is not included in the lateral groove. Since the inner middle rib 7 may have a high circumferential and lateral rigidity more than the block row 6, the tire 1 in accordance with the present invention may further improve straight ahead stability, cornering performance, and low rolling resistance. Preferably, the inner middle rib 7 has an axial width W9 in a range of from 7% to 15% in relation to the tread width TW (shown in FIG. 1).

The inner middle rib 7 is provided with a plurality of axially inner middle lug grooves 23 that extend axially inward from the middle main groove 3B without communicating with the crown main groove 3A.

Each inner middle lug groove 23 extends from the axially innermost protrusion portion 3Bi of the middle main groove 3B toward the axially outermost protrusion portion 3Ao of the crown main groove 3A while inclining at an angle α2d with respect to the circumferential direction of the tire. In this embodiment, the angle α2d is the same as the angle α2b (shown in FIG. 6) of the outer middle lateral groove 4B. Such an inner middle lug groove 23 may help to reduce traveling noise of the tire by preventing that the air compressed between the road and the inner middle lug groove 23 during traveling comes into the crown main groove 3A.

Furthermore, the inclined inner middle lug groove 23 may smoothly remove the water from under the tread portion 2 to axially outward so as to improve wet grip performance of the tire. Preferably, the inner middle lug groove 23 has its groove width W8 in a range of from 2.5% to 4.0% in relation to the tread width TW (shown in FIG. 1). Preferably, the minimum distance L8 between the axially inner end of the inner middle lug groove 23 and the crown main groove 3A is set in a range of from 1.3% to 2.5% in relation to the tread width TW.

As shown in FIG. 2 and FIG. 4, the inner middle lug groove 23 includes a shallow bottom part 25 having a depth D5d in a range of from 50% to 70%, more preferably in a range of from 25% to 60% in relation to the maximum groove depth D2a of the crown main groove 3A. Since the shallow bottom part 25 enhances circumferential rigidity of the inner middle rib 7, fuel consumption of the tire may be economized.

The shallow bottom part 25 is provided with an inner middle groove-bottom sipe 26 that extends along the groove centerline of the inner middle lug groove 23, for example. The inner middle groove-bottom sipe 26 may deform during traveling of the tire so as to expand the groove width W8 of the inner middle lateral groove 23, thereby further improving wet performance of the tire. Furthermore, since the inner middle groove-bottom sipe 26 may come into contact with the ground at the last stage of wear of the tread portion 2, the edge of the inner middle groove-bottom sipe 26 may help to improve wet performance.

To further improve the advantages above, the inner middle groove-bottom sipe 26 preferably has its depth D7d (not shown) in a range of not less than 20%, more preferably not less than 25%, but preferably not more than 75%, more preferably not more than 70% in relation to the maximum groove depth D2a of the crown main groove 3A.

To further improve wet grip performance of the tire, the axially outer end of the inner middle groove-bottom sipe 26 is preferably connected to the short sipe 14A of the middle main groove 3B at the axially innermost protruding portion 3Bi.

In this embodiment, the inner middle rib 7 is provided with a sipe 32 that extends from the axially inner end of the inner middle groove-bottom sipe 26 to the crown main groove 3A. The sipe 32 may help to lower rigidity of a sandwiched portion of the inner middle rib 7 between the axially inner end of the inner middle groove-bottom sipe 26 and the crown main groove 3A so as to prevent stress concentration thereto during traveling. Furthermore, the sipe 32 may effectively expand the groove width W8 of the inner middle lug groove 23 during traveling to further improve wet grip performance of the tire.

In this embodiment, the inner middle lib 7 is provided with a recess 30 that extends axially inward in a short length from the axially outmost protruding portion 3Bo of the middle main groove 3B. The recess 30 offers a rectangle space for draining out the water from under the inner middle lib 7.

As shown in FIG. 3, each crown block 5A is configured as a circumferential long rectangular shape having a circumferential length L6a greater than the its axial width W6a. Since the crown block 5A may have high circumferential rigidity, less energy loss during traveling for lowering fuel consumption may be achieved. Preferably, the crown block 5A has the length L6a in a range of from 25% to 40% in relation to the tread width TW (shown in FIG. 1), and the width W6a in a range of from 8% to 20% in relation to the tread width TW.

The crown block 5A is provided with a chamfer portion 34 at its corner having an acute angle between the crown lateral groove 4A and the crown main groove 3A. The chamfer portion 34 may prevent the corner chipping. Furthermore, the chamfer portion 34 may disturb the air flow passing through the crown main groove 3A so that the columnar resonance noise generated from the crown main groove 3A is reduced.

As shown in FIG. 6, the outer middle block 5B has a circumferentially long hexagonal shape protruding axially inwardly and having its circumferential length L6b larger than its axial width W6b. The outer middle block 5B with high circumferential rigidity may further improve fuel consumption, traction performance, and steering stability of the tire, same as the crown block 5A. Preferably, the outer middle block 5B has the length L6b in a range of from 25% to 40% in relation to the tread width TW (shown in FIG. 1), and the width W6b in a range of from 7% to 15% in relation to the tread width TW.

In this embodiment, the outer middle block 5B is provided with a recess 36 that extends axially outward in a short length from the axially innermost protruding portion 3Bi of the middle main groove 3B. The recess 36 offers a rectangle space for draining out the water from under the outer middle block 5B, and prevents damage such as chipping on the outer middle block 5B.

In a plan view, the shoulder block 5C has a circumferentially long rectangular shape having its circumferential length L6c larger than its axial width W6c. Thus, since the shoulder block 5C may have high circumferential rigidity, low fuel consumption, traction performance, and steering stability of the tire may further be improved, same as the crown block 5A and the outer middle block 5B. Preferably, the shoulder block 5C has the length L6c in a range of from 25% to 35% in relation to the tread width TW (shown in FIG. 1), and the width W6c in a range of from 10% to 20% in relation to the tread width TW.

Preferably, the shoulder block 5C is provided with a chamfer portion 37 at a corner having an acute angle between the shoulder lateral groove 4C and the shoulder main groove 3C. The chamfer portion 37 may improve chipping resistance of the shoulder block 5C as well as noise performance.

Furthermore, the shoulder block 5C is provided with a plurality of semi-opened shoulder sipes 38 that extends axially inwardly of the tire from the tread edge 2t in a short length so as to have axially inner ends without reaching the shoulder main groove 3C. Since the shoulder sipes 38 soften the axially outer edge of each shoulder block, the tire 1 may offer excellent wandering resistance during traveling.

While the particularly preferable embodiments of the present invention have been described in detail, the present invention in not limited to the illustrated embodiments, but can be modified and carried out in various aspects.

Comparison Test

Heavy duty pneumatic tires shown in FIG. 1 and Table 1 were manufactured and tested. The details of test tires and test methods are as follows.

Details of Test Tires:
Tire size: 275/80R22.5 151/148J
Rim: 22.5×7.5
Tread width TW: 248 mm
Crown main groove width W2a: 6 mm (W2a/TW: 2.4%)
Crown main groove maximum depth D2a: 16 mm (D2a/TW: 6.5%)
Crown main groove zigzag pitch length P2a: 80 mm (P2a/TW: 32.3%)
Crown main groove zigzag amplitude S2a: 2 mm (S2a/TW: 0.8%)
Middle main groove width W2b: 5 mm (W2b TW: 2.0%)
Middle main groove zigzag pitch length P2b: 80 mm (P2b/TW: 32.3%)
Middle main groove zigzag amplitude S2b: 8 mm (S2b/TW: 3.2%)
Shoulder main groove width W2c: 10 mm (W2c/TW: 4.0%)
Shoulder main groove maximum depth D2c: 16 mm (D2c/TW: 6.5%)
Shoulder main groove zigzag pitch length P2c: 80 mm (P2c/TW: 32.3%)
Shoulder main groove zigzag amplitude S2c: 2 mm (S2c/TW: 0.80%)
Crown lateral groove angle α2a: 65 degrees
Crown lateral groove maximum depth D1a: 10 mm (D1a/TW: 4.0%)
Outer middle lateral groove angle α2b: 65 degree
Shoulder lateral groove angle α2c: 80 degree
Shoulder lateral groove maximum depth D1c: 16 mm (D1c/TW: 6.5%)
Inner middle rib width W9: 26 mm (W9/TW: 10.5%)
Inner middle lug groove angle α2d: 65 degrees
Inner middle lug groove width W8: 8 mm (W8/TW: 3.2%)
Crown block length L6a: 80 mm (L6a/TW: 32.3%)
Crown block width W6a: 30 mm (W6a/TW: 12.1%)
Outer middle block length L6b: 74 mm (L6b/TW: 29.8%)
Outer middle block width W6b: 28 mm (W6b/TW: 11.3%)
Shoulder block length L6c: 70 mm (L6c/TW: 28.2%)
Shoulder block width W6c: 37 mm (W6c/TW: 14.9%)
Shallow bottom part length L5a of crown lateral groove: 25 mm (L5a/W6a: 83.3%)
Shallow bottom part length L5c of shoulder lateral groove: 3 mm (L5c/W6c: 8.1%)
Shallow bottom part depth D5c of shoulder lateral groove: 6.4 mm (D5c/D2a: 40%)

Fuel Consumption Performance Test (Rolling Resistance Test):

Rolling resistance of each test tire was measured under the following condition, using a tester. The test results were evaluated as the reciprocal of the rolling resistance and were indicated using an index based on Ex. 1 being 100 in Table 1. The larger the index, the better the rolling resistance is.
Internal pressure: 900 kPa
Tire load: 33.83 kN
Speed: 80 km/h Wet Grip Performance Test:

The test tires were installed in a 2-D truck with a full load to its carrying capacity 10 tons, as its whole wheels. Then, a test driver suddenly started the truck using the second gear position by engaging its clutch at the timing of a 1,500 rpm engine speed on a wet asphalt road with a puddle 5 mm deep, and measured the time for traveling to 10 m distance. The test results were evaluated as the reciprocal of the time and were indicated using an index based on Ex. 1 being 100 in Table 1. The larger the index, the better the wet performance is.

Noise Performance Test:

The test tire was made to run on a drum having a diameter of 1.7 m and asphalt road surface (ISO road surface) based on the following condition, and then the noise sound level in dB(A) was measured with a microphone set at 0.32 meter height from the road surface, 0.2 meter behind from the tire rotational axial, and 1.0 meter sideways from the tread edge of the tire. The results in Table 1 are indicated as the reciprocal number of measured value using an index based on Ex. 1 being 100. The larger the value, the better the performance is.
Internal pressure: 900 kPa Tire load: 23.8 kN
Test place: Anechoic chamber room Test results are shown in Table 1. From the test results, it was confirmed that Example tires in accordance with the present invention offered better performance with respect to fuel consumption, traveling noise, and wet grip.

TABLE 1

| | Ex. 1 | Ex. 2 | Ex. 3 | Ex. 4 | Ref. 1 | Ref. 2 | Ex. 5 | Ex. 6 | Ex. 7 | Ex. 8 | Ref. 3 |
|---|---|---|---|---|---|---|---|---|---|---|---|
| Land ratio of tread portion (%) | 78 | 75 | 80 | 70 | 65 | 85 | 78 | 78 | 78 | 78 | 78 |
| Number of pitch elements | 45 | 45 | 45 | 45 | 45 | 45 | 42 | 48 | 40 | 50 | 38 |
| Ratio W1a/L6a (%) | 0.1 | 0.1 | 0.1 | 0.1 | 0.1 | 0.1 | 0.1 | 0.1 | 0.1 | 0.1 | 0.1 |
| Ratio W1b/L6b (%) | 0.1 | 0.1 | 0.1 | 0.1 | 0.1 | 0.1 | 0.1 | 0.1 | 0.1 | 0.1 | 0.1 |
| Ratio W1c//L6c (%) | 0.1 | 0.1 | 0.1 | 0.1 | 0.1 | 0.1 | 0.1 | 0.1 | 0.1 | 0.1 | 0.1 |
| Ratio D5a/D2a (%) | 55 | 55 | 55 | 55 | 55 | 55 | 55 | 55 | 55 | 55 | 55 |
| Ratio D7a/D2a (%) | 33 | 33 | 33 | 33 | 33 | 33 | 33 | 33 | 33 | 33 | 33 |
| Ratio D3a/D2a (%) | 52 | 52 | 52 | 52 | 52 | 52 | 52 | 52 | 52 | 52 | 52 |
| Ratio D3b/D2a (%) | 40 | 40 | 40 | 40 | 40 | 40 | 40 | 40 | 40 | 40 | 40 |
| Ratio D4a/D2a (%) | 40 | 40 | 40 | 40 | 40 | 40 | 40 | 40 | 40 | 40 | 40 |
| Ratio D5b/D2a (%) | 40 | 40 | 40 | 40 | 40 | 40 | 40 | 40 | 40 | 40 | 40 |
| Ratio D7b/D2a (%) | 40 | 40 | 40 | 40 | 40 | 40 | 40 | 40 | 40 | 40 | 40 |
| Ratio D5d/D2a (%) | 40 | 40 | 40 | 40 | 40 | 40 | 40 | 40 | 40 | 40 | 40 |
| Ratio D7d/D2a (%) | 40 | 40 | 40 | 40 | 40 | 40 | 40 | 40 | 40 | 40 | 40 |
| Rolling resistance (Index) | 100 | 100 | 100 | 98 | 95 | 100 | 100 | 100 | 100 | 98 | 100 |
| Wet grip performance (Index) | 100 | 100 | 100 | 100 | 100 | 95 | 100 | 100 | 98 | 100 | 95 |
| Noise performance (Index) | 100 | 100 | 100 | 100 | 100 | 100 | 100 | 100 | 100 | 100 | 100 |

| | Ref. 4 | Ex. 9 | Ex. 10 | Ex. 11 | Ex. 12 | Ref. 5 | Ref. 6 | Ex. 13 | Ex. 14 | Ex. 15 | Ex. 16 |
|---|---|---|---|---|---|---|---|---|---|---|---|
| Land ratio of tread portion (%) | 78 | 78 | 78 | 78 | 78 | 78 | 78 | 78 | 78 | 78 | 78 |
| Number of pitch elements | 52 | 45 | 45 | 45 | 45 | 45 | 45 | 45 | 45 | 45 | 45 |
| Ratio W1a/L6a (%) | 0.1 | 0.08 | 0.12 | 0.05 | 0.15 | 0.03 | 0.17 | 0.1 | 0.1 | 0.1 | 0.1 |
| Ratio W1b/L6b (%) | 0.1 | 0.08 | 0.12 | 0.05 | 0.15 | 0.03 | 0.17 | 0.1 | 0.1 | 0.1 | 0.1 |
| Ratio W1c//L6c (%) | 0.1 | 0.08 | 0.12 | 0.05 | 0.15 | 0.03 | 0.17 | 0.1 | 0.1 | 0.1 | 0.1 |
| Ratio D5a/D2a (%) | 55 | 55 | 55 | 55 | 55 | 55 | 55 | 57 | 53 | 60 | 50 |
| Ratio D7a/D2a (%) | 33 | 33 | 33 | 33 | 33 | 33 | 33 | 33 | 33 | 33 | 33 |
| Ratio D3a/D2a (%) | 52 | 52 | 52 | 52 | 52 | 52 | 52 | 52 | 52 | 52 | 52 |
| Ratio D3b/D2a (%) | 40 | 40 | 40 | 40 | 40 | 40 | 40 | 40 | 40 | 40 | 40 |
| Ratio D4a/D2a (%) | 40 | 40 | 40 | 40 | 40 | 40 | 40 | 40 | 40 | 40 | 40 |
| Ratio D5b/D2a (%) | 40 | 40 | 40 | 40 | 40 | 40 | 40 | 40 | 40 | 40 | 40 |
| Ratio D7b/D2a (%) | 40 | 40 | 40 | 40 | 40 | 40 | 40 | 40 | 40 | 40 | 40 |
| Ratio D5d/D2a (%) | 40 | 40 | 40 | 40 | 40 | 40 | 40 | 40 | 40 | 40 | 40 |
| Ratio D7d/D2a (%) | 40 | 40 | 40 | 40 | 40 | 40 | 40 | 40 | 40 | 40 | 40 |
| Rolling resistance (Index) | 95 | 100 | 100 | 100 | 99 | 100 | 95 | 100 | 100 | 98 | 100 |
| Wet grip performance (Index) | 100 | 100 | 100 | 98 | 100 | 95 | 100 | 100 | 100 | 100 | 98 |
| Noise performance (Index) | 100 | 100 | 100 | 100 | 98 | 100 | 95 | 100 | 100 | 100 | 100 |

| | Ex. 17 | Ex. 18 | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|---|
| Land ratio of tread portion (%) | 78 | 78 | 78 | 78 | 78 | 78 | 78 | 78 | 78 | 78 | 78 |
| Number of pitch elements | 45 | 45 | 45 | 45 | 45 | 45 | 45 | 45 | 45 | 45 | 45 |
| Ratio W1a/L6a (%) | 0.1 | 0.1 | 0.1 | 0.1 | 0.1 | 0.1 | 0.1 | 0.1 | 0.1 | 0.1 | 0.1 |
| Ratio W1b/L6b (%) | 0.1 | 0.1 | 0.1 | 0.1 | 0.1 | 0.1 | 0.1 | 0.1 | 0.1 | 0.1 | 0.1 |
| Ratio W1c//L6c (%) | 0.1 | 0.1 | 0.1 | 0.1 | 0.1 | 0.1 | 0.1 | 0.1 | 0.1 | 0.1 | 0.1 |
| Ratio D5a/D2a (%) | 65 | 45 | 55 | 55 | 55 | 55 | 55 | 55 | 55 | 55 | 55 |
| Ratio D7a/D2a (%) | 33 | 33 | 30 | 35 | 25 | 40 | 20 | 45 | 33 | 33 | 33 |
| Ratio D3a/D2a (%) | 52 | 52 | 52 | 52 | 52 | 52 | 52 | 52 | 52 | 52 | 52 |
| Ratio D3b/D2a (%) | 40 | 40 | 40 | 40 | 40 | 40 | 40 | 40 | 60 | 25 | 70 |
| Ratio D4a/D2a (%) | 40 | 40 | 40 | 40 | 40 | 40 | 40 | 40 | 40 | 40 | 40 |
| Ratio D5b/D2a (%) | 40 | 40 | 40 | 40 | 40 | 40 | 40 | 40 | 60 | 25 | 70 |
| Ratio D7b/D2a (%) | 40 | 40 | 40 | 40 | 40 | 40 | 40 | 40 | 40 | 40 | 40 |
| Ratio D5d/D2a (%) | 40 | 40 | 40 | 40 | 40 | 40 | 40 | 40 | 60 | 25 | 70 |
| Ratio D7d/D2a (%) | 40 | 40 | 40 | 40 | 40 | 40 | 40 | 40 | 40 | 40 | 40 |
| Rolling resistance (Index) | 98 | 100 | 100 | 100 | 100 | 98 | 100 | 98 | 100 | 100 | 98 |
| Wet grip performance (Index) | 100 | 98 | 100 | 100 | 98 | 100 | 98 | 100 | 100 | 100 | 100 |
| Noise performance (Index) | 100 | 100 | 100 | 100 | 100 | 100 | 100 | 100 | 100 | 100 | 100 |

| | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|
| Land ratio of tread portion (%) | 78 | 78 | 78 | 78 | 78 | 78 | 78 | 78 | 78 |
| Number of pitch elements | 45 | 45 | 45 | 45 | 45 | 45 | 45 | 45 | 45 |
| Ratio W1a/L6a (%) | 0.1 | 0.1 | 0.1 | 0.1 | 0.1 | 0.1 | 0.1 | 0.1 | 0.1 |
| Ratio W1b/L6b (%) | 0.1 | 0.1 | 0.1 | 0.1 | 0.1 | 0.1 | 0.1 | 0.1 | 0.1 |
| Ratio W1c//L6c (%) | 0.1 | 0.1 | 0.1 | 0.1 | 0.1 | 0.1 | 0.1 | 0.1 | 0.1 |
| Ratio D5a/D2a (%) | 55 | 55 | 55 | 55 | 55 | 55 | 55 | 55 | 55 |
| Ratio D7a/D2a (%) | 33 | 33 | 33 | 33 | 33 | 33 | 33 | 33 | 33 |
| Ratio D3a/D2a (%) | 52 | 52 | 52 | 52 | 52 | 52 | 52 | 52 | 52 |
| Ratio D3b/D2a (%) | 15 | 75 | 10 | 40 | 40 | 40 | 40 | 40 | 40 |
| Ratio D4a/D2a (%) | 40 | 40 | 40 | 25 | 70 | 20 | 75 | 15 | 80 |
| Ratio D5b/D2a (%) | 15 | 75 | 10 | 40 | 40 | 40 | 40 | 40 | 40 |
| Ratio D7b/D2a (%) | 40 | 40 | 40 | 25 | 70 | 20 | 75 | 15 | 80 |
| Ratio D5d/D2a (%) | 15 | 75 | 10 | 40 | 40 | 40 | 40 | 40 | 40 |
| Ratio D7d/D2a (%) | 40 | 40 | 40 | 25 | 70 | 20 | 75 | 15 | 80 |
| Rolling resistance (Index) | 100 | 98 | 100 | 100 | 100 | 100 | 98 | 100 | 98 |
| Wet grip performance (Index) | 98 | 100 | 98 | 100 | 100 | 98 | 100 | 98 | 100 |
| Noise performance (Index) | 100 | 100 | 100 | 100 | 100 | 100 | 100 | 100 | 100 |

What is claimed is:

1. A heavy duty pneumatic tire comprising:
a tread portion provided with at least three circumferentially and continuously extending main grooves and a plurality of lateral grooves extending between adjacent main grooves or between one main groove and a tread edge to form a block row comprising a plurality of blocks;
the at least three main grooves comprising a pair of crown main grooves disposed on both sides of a tire equator and a pair of middle main grooves disposed axially outward of the crown main grooves;
the middle main grooves comprising shallow bottom parts having a groove depth in a range of from 15% to 70% in relation to a maximum groove depth of the crown main grooves;
the shallow bottom parts comprising first shallow bottom parts and second shallow bottom parts alternately arranged in a circumferential direction of the tire, the second shallow bottom parts having groove depths larger than groove depths of the first shallow bottom parts; and
the block row comprising a plurality of pitch elements each of which consists of circumferentially adjacent one lateral groove and one block, wherein
the tread portion has a land ratio in a range of from 70% to 80%,
the block row comprises a number of pitch elements in a range of from 40 to 50, and
each lateral groove has a groove width in a range of from 5% to 15% in relation to a circumferential length of the block in each pitch element.

2. The tire according to claim 1,
wherein the lateral grooves comprise a plurality of crown lateral grooves extending between the crown main grooves to form a crown block row comprising a plurality of crown blocks,
each crown lateral groove comprises a shallow bottom part having a groove depth in a range of from 50% to 60% in relation to a maximum groove depth of the crown main grooves, and
the shallow bottom part is provided with a crown groove-bottom sipe that extends along a longitudinal direction of the crown lateral groove and has a depth in a range of from 25% to 40% in relation to the maximum groove depth of the crown main grooves.

3. The tire according to claim 2,
wherein the main grooves further comprise a pair of shoulder main grooves disposed axially outward of the middle main grooves,
the lateral grooves further comprise a plurality of axially outer middle lateral grooves extending between the middle main groove and the shoulder main groove to form an outer middle block row comprising a plurality of axially outer middle blocks on each side of the tire equator,
the middle main grooves and the outer middle lateral grooves comprise respective shallow bottom parts each having a groove depth in a range of from 15% to 70% in relation to the maximum groove depth of the crown main grooves,
the shallow bottom part of the middle main groove is provided with a middle groove-bottom sipe that extends along a longitudinal direction of the middle main groove,
the shallow bottom part of the outer middle lateral groove is provided with an outer middle groove-bottom sipe that extends along a longitudinal direction of the outer middle lateral groove, and
each depth of the middle groove-bottom sipe and the outer middle groove-bottom sipe is in a range of from 20% to 75% in relation to the maximum groove depth of the crown main grooves.

4. The tire according to claim 3,
wherein the tread portion further comprises a circumferentially and continuously extending inner middle rib arranged between the crown main groove and the middle main groove,
the inner middle rib is provided with a plurality of axially inner middle lateral grooves extending axially inward from the middle main groove without reaching the crown main groove,
each axially inner middle lateral groove comprises a shallow bottom part having a groove depth in a range of from 15% to 70% in relation to the maximum groove depth of the crown main grooves,
the shallow bottom part of the inner middle lateral groove is provided with an inner middle groove-bottom sipe that extends along a longitudinal direction of the inner middle lateral groove, and
each depth of the inner middle groove-bottom sipe is in a range of from 20% to 75% in relation to the maximum groove depth of the crown main grooves.

5. The tire according to claim 1, wherein each of the middle main grooves is configured as a zigzag form having a plurality of zigzag corners, the second shallow bottom parts are disposed on each zigzag corner of the middle main groove and each first shallow bottom part is disposed between adjacent second shallow bottom parts.

6. The tire according to claim 1, wherein the groove depths of the first shallow bottom parts are in a range of from 47% to 58% the groove depths of the second shallow bottom parts.

7. The tire according to claim 1, wherein
each of the middle main grooves is configured as a zigzag form having a plurality of zigzag corners,
the middle main groove comprises a groove bottom provided with a plurality of middle groove-bottom sipes, and
the middle groove-bottom sipes are configured as inclined elements which are arranged so as to be separated from one another at the respective zigzag corners.

8. The tire according to claim 1, wherein the block row comprises crown blocks, outer middle blocks and shoulder blocks, and wherein the crown main grooves and the middle main grooves define an inner middle rib therebetween and the first and second shallow parts connect the outer middle blocks with the inner middle rib.

9. The tire according to claim 1, wherein the first and second shallow bottom parts have a depth of 25% to 60% relative to the maximum groove depth of the crown main grooves.

10. The tire according to claim 1, wherein the crown main grooves contain protrusions which protrude radially outward from the groove bottom.

* * * * *